United States Patent
Abes et al.

(10) Patent No.: US 11,461,290 B2
(45) Date of Patent: Oct. 4, 2022

(54) SYSTEM AND METHOD FOR RUN-TIME ADAPTABLE POLICY ENGINE FOR HETEROGENEOUS MANAGED ENTITIES

(71) Applicant: CloudHealth Technologies, Inc., Boston, MA (US)

(72) Inventors: Andi Abes, Waltham, MA (US); Adam Paul Schepis, Milford, MA (US); Vikram K. Pillai, Westford, MA (US); Joe Kinsella, Reading, MA (US)

(73) Assignee: VMWARE, INC., Palo Alto, CA (US)

( * ) Notice: Subject to any disclaimer, the term of this patent is extended or adjusted under 35 U.S.C. 154(b) by 1098 days.

(21) Appl. No.: 15/952,181

(22) Filed: Apr. 12, 2018

(65) Prior Publication Data
US 2019/0318019 A1 Oct. 17, 2019

(51) Int. Cl.
*G06F 16/00* (2019.01)
*G06F 16/21* (2019.01)
*G06F 16/22* (2019.01)
*G06F 9/455* (2018.01)

(52) U.S. Cl.
CPC ............ *G06F 16/211* (2019.01); *G06F 16/22* (2019.01); *G06F 9/45533* (2013.01)

(58) Field of Classification Search
CPC .............................. G06F 16/211; G06F 16/22
USPC ........................................................ 707/803
See application file for complete search history.

(56) References Cited

U.S. PATENT DOCUMENTS

| 2009/0150511 | A1* | 6/2009 | Gross | ............... G06F 12/0813 709/213 |
| 2014/0337429 | A1* | 11/2014 | Asenjo | .................. H04L 67/10 709/204 |
| 2016/0119357 | A1* | 4/2016 | Kinsella | ............... H04L 63/102 726/1 |
| 2018/0285166 | A1* | 10/2018 | Roy | ..................... G06F 9/5016 |

OTHER PUBLICATIONS

"Amazon EC2 Auto Scaling", 9 pages, https://aws.amazon.com/ec2/autoscaling/?sc_channell=ba&sc_campaign...c_medium=button&sc_country=global&sc_geo=global&sc_outcome=aware, retrieved Aug. 24, 2018.

(Continued)

*Primary Examiner* — Chelcie L Daye
(74) *Attorney, Agent, or Firm* — Hanley, Flight & Zimmerman, LLC

(57) ABSTRACT

A computer-implemented method of executing a policy-based operation on a shared computer infrastructure includes storing in a computer memory a dynamically extensible metadata system that is in communication with a processor that executes policy-based operations, where the dynamically extensible metadata system includes a data structure, a collection method, a policy processing method, and a policy condition. The collection method is then executed to collect data from a first computer resource in the shared computer infrastructure using a first data structure and from a second computer resource in the shared computer infrastructure using a second data structure, where the first data structure and the second data structure are different data structures. The collected data is then processed with the policy processing method to determine if the collected data meets the policy condition.

44 Claims, 6 Drawing Sheets

(56) References Cited

OTHER PUBLICATIONS

Jeff Barr, "AWS Auto Scaling", Jan. 6, 2018, 8 pages, Amazon Web Services, Inc., https://aws.amazon.com/autoscaling/, retrieved Aug. 24, 2018.

Jiangjie (Becket) Qin, et al., "Introduction to Kafka Cruise Control", 2016, 47 pages, LinkedIn Corporation, https://www.slideshare.net/JiangjieQin/introduction-to-kafka-cruise-control-68180931, retrieved Aug. 24, 2018.

"What are Virtual Machine Scale Sets?" Mar. 26, 2018, 3 pages; https://docs.microsoft.com/en-us/azure/virtual-machine-scale-sets/overview, retrieved Aug. 24, 2018.

Meng Zhang, "Nuage: Making Data Systems Management Scalable", Aug. 7, 2018, 7 pages, LinkedIn Corporation, https://engineering.linkedin.com/blog/2018/08/nuage-making-data-systems-management-scalable, retrieved Aug. 24, 2018.

Manish Dubey, "Rain: Better Resource Allocation Through Containerization", May 10, 2016, 6 pages, LinkedIn Corporation, https://engineering.linkedin.com/blog/2016/05/rain-better-resource-allocation-through-containerization, retrieved Aug. 24, 2018.

U.S. Appl. No. 15/722,356, filed Oct. 2, 2017 in the USPTO.

\* cited by examiner

SYSTEM AND METHOD FOR RUN-TIME ADAPTABLE POLICY ENGINE FOR HETEROGENEOUS MANAGED ENTITIES

The section headings used herein are for organizational purposes only and should not to be construed as limiting the subject matter described in the present application in any way.

INTRODUCTION

Modern information technology (IT) environments have several important characteristics that impact their management and governance. For example, managed entities in modern IT environments number in the millions. These managed entities are uniquely identifiable and controlled. Examples of managed entities include a data storage unit, a computer processing unit (CPU), and a snapshot. A snapshot is a state of a computing system or a virtual machine at a particular point in time. The sheer amount of data which must be considered in order to take an action on or with these managed entities is beyond human capacity. Consequentially automated solutions are required.

Another characteristic of modern IT environments is the increasing diversity of managed entities. The pace of innovation in the IT industry has led to exponential growth in types of resources being consumed, requiring governance tooling and personnel to continuously adapt. In addition, modern IT environments are generally characterized by a high rate of change. While more traditional computing environments historically have changed at human pace, by human actions, modern systems are often provisioned and configured using automated reactive systems. These automated reactive systems are needed to efficiently apply governance policies in modern IT environments.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicant's teaching in any way.

DESCRIPTION OF VARIOUS EMBODIMENTS

Figure 1:
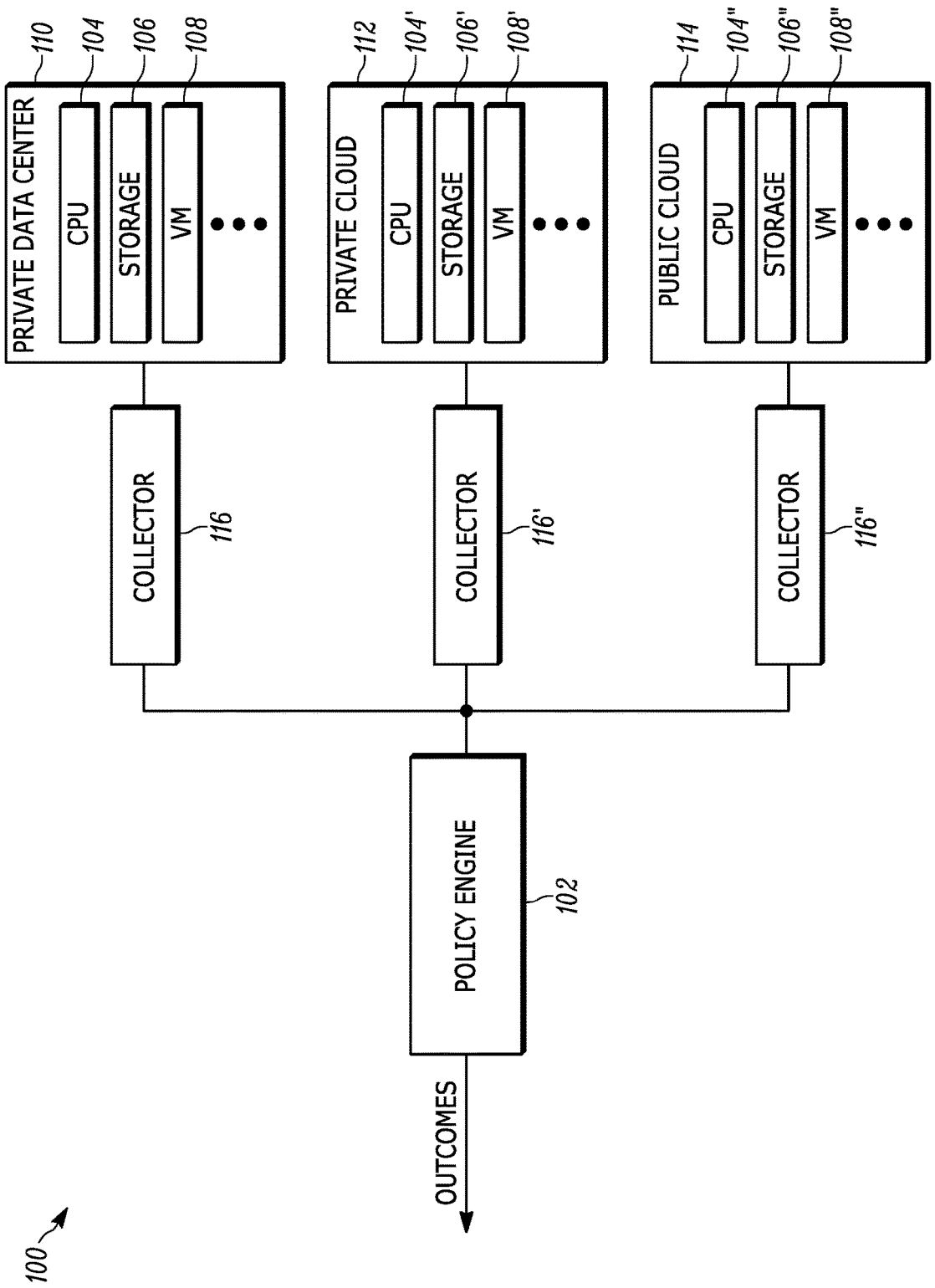
FIG. 1 illustrates a system block diagram that implements a run-time adaptable policy engine for heterogeneous managed entities according to one embodiment of the present teaching.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teachings can be performed in any order and/or simultaneously as long as the teaching remains operable. Furthermore, it should be understood that the apparatus and methods of the present teachings can include any number or all of the described embodiments of steps of the method as long as the teaching remains operable.

The integrated reporting, governance and compliance activities commonly performed by legacy information technology infrastructures are still immature in their development for cloud-based systems and/or systems with a high rate of change. Furthermore, it is often challenging to manage compliance in these shared cloud-based computer infrastructure components.

Many aspects of the present teaching relate to cloud-based computer infrastructures. The terms "cloud" and "cloud-based infrastructure" as used herein include a variety of computing resource, computer and software services, and networking resources that run over a variety of physical communications infrastructures, including wired and/or wireless infrastructures. These physical communications infrastructures may be privately or publicly owned, used and operated. In particular, it should be understood that the term "cloud" as used herein refers to private clouds, public clouds, and hybrid clouds. The term "private cloud" refers to computer hardware, networking and computer services that run entirely or almost entirely over a private or proprietary infrastructure. The term "public cloud" refers to computer hardware, networking and services that run over the public internet. The term "hybrid cloud" refers to computer hardware, networking, and services that utilize infrastructure in both the private cloud and in the public cloud.

Information technology practitioners in modern computing environments use a large variety of technologies to achieve their goals, resulting in a large variety of heterogeneous managed computing entities. Examples of managed computing entities include a data storage unit such as a disk drive, a central processing unit (CPU), and a snapshot, which is a state of a computing system or a virtual machine at a particular point in time. Information technology practitioners use an equally large variety of management systems to operate them. This diversity of management tools imposes a large burden on users and system designers.

The present teaching provides solutions for unified management and governance of these diverse tools and heterogeneous managed computing entities. In particular, the present teaching provides a consistent layer of computing management and governance capabilities on a variety of different computing resources that are owned and operated by, in some cases, multiple entities. In contrast to prior approaches that required development of custom code and logic for each type of data to be used for management and governance derived from each type of managed entity, the present teaching allows the declarative addition of new types and sources of data into the unified model, that can then be evaluated for compliance with desired state. This is achieved by ingesting data from point solutions, and then normalizing and correlating the different datum into a consistent model. The state of the unified model can then be evaluated for compliance to a desired state as expressed by a flexible expression language. Providing a unified system greatly simplifies operations of complex and diverse IT systems that comprise a large number of heterogeneous managed entities.

A variety of prior art systems for modeling managed elements to allow unified management and governance provide limited extensibility of data types at runtime, and lack the ability to adapt to heterogeneous managed systems that change over time. For example, Simple Network Management Protocol (SNMP) is a well-known and widely used protocol for network management that is used for collecting information from, and configuring, network devices, such as servers, printers, hubs, switches, and routers on an Internet Protocol (IP) network. SNMP can also monitor services, such as Dynamic Host Configuration Protocol (DHCP) and Windows Internet Name Service (WINS). SNMP allows users to monitor network nodes from a management host.

Users must declare new data elements when using SNMP to extend the collection of new data elements. For example, an operator can add new Management Information Base (MIB) definitions and/or describe the logical data to be collected. In contrast to the prior art, the present teaching changes the data collection component, normalizes collected data, and adds a layer of governance policy evaluation leveraging the new normalized data elements as compared to these prior art schemes.

Common Information Model (CIM) is another standard that provides a uniform representation of managed elements and means to control them in an information technology environment. While the CIM common model advantageously allows multiple management software applications to operate on IT resources without complex and costly conversion, the static nature prevents rapid change to new and evolving resources and needs. In general, SNMP, CIM and other prior approaches to implementing policy engine applications allowed for limited extensibility of the data types, and no ability to adapt at runtime. In prior art systems and methods, the changes to data types were typically only under user control, and were not automated. In contrast, the system described in the present teaching allows for dynamic introduction of new capabilities into the system. These new capabilities include new sources of data, new channels for collecting data, new types of data to collect, and new types of analysis to be applied to collected data.

In particular, systems and methods according to the present teaching provide an adaptable system that allows its users to efficiently apply governance policies around cost, usage, utilization security, and efficiency, at scale, in the presence of high velocity changes. One feature of the systems according to the present teaching is that they can dynamically adapt to new data, new sources of data, and new types of data, automatically and very rapidly.

A policy engine is generally described as a software component that can generate, monitor and/or enforce rules related to allowed parameters for information technology assets, such as computers, processors, databases, data and data storage, and network resources. Policy engines may further generate, monitor, and/or enforce rules related to how those assets are accessed and used. Prior art policy engines are generally constrained by their limited ability to express complex rules across heterogeneous data types. For example, if the deployment of an Elasticsearch™ cluster costs more than $250 per day and is utilizing less than 3% average CPU per day, and it's operating off hours, it is impossible for prior art policy engines to determine this condition or to implement a policy based on these data. In addition, prior art policy engines are limited in their ability to dynamically extend the available data types for policy rules. For example, prior art policy engines are not capable of expanding rules that are currently running on Amazon Web Services Cloud, a commonly used service product provided by Amazon Web Services, Inc. to allow the same policy rules to run on Alibaba Cloud, another commonly used service product provided by Alibaba Group. In addition, prior art policy engines are limited in their ability to extend the expressions available to policy rules. For example, prior art policy engines are unable to add a concept of average cost to policy rules.

FIG. 1 illustrates a system block diagram 100 that implements a run-time adaptable policy engine 102 for heterogeneous managed entities 104, 104', 104", 106, 106', 106", 108, 108', 108" according to one embodiment of the present teaching. The system 100 monitors and/or governs the information gathered from various known types of shared infrastructure, including private data centers 110, private clouds 112, and/or public clouds 114. A private data center 110 can, for example, contain a suite of information technology infrastructure or resources 104, 106, 108. The suite of information technology infrastructure or resources 104, 106, 108 can be located on premise at an enterprise, or can be located off site. The data center 110 can include a set of servers. The servers include hardware CPU 104 and storage 106. The data center 110 can implement virtual machines 108. For example, the CPUs may run VMware® or other known virtualization software such as XenServer®. A private cloud 112 can contain a suite of information technology infrastructure or resources 104', 106', 108' that are owned and operated by an entity that is separate from the user of the resources. Such a suite of information technology infrastructure or resources 104', 106', 108' is often leased by the user from the separate owner. The private cloud 112 may also run VMware® or other known virtualization software such as XenServer® that is used to maintain separation of the applications and services running for multiple shared tenants in the private cloud. A public cloud 114, such as, for example Amazon's AWS, Microsoft Azure, and Google Cloud Platform, provide shared-use cloud resources, including CPUs 104", storage 106" and/or virtual machines 108" to customers.

The system 100 uses collectors 116, 116', 116" that collect and optionally aggregate and/or optionally validate various forms of activity data from the shared infrastructure platforms 110, 112, 114. The collectors 116, 116', 116" may use a variety of known approaches to collecting information on various assets, metrics, logs and events from shared infrastructure platforms 110, 112, 114. The collectors 116, 116', 116" can collect data by involving an application programming interface (API) to fetch data, or they can ingest data by accepting inbound data sent by the platform 110, 112, 114 or resource. Also, a collector can, for example, include software that runs on a physical server or inside a virtual machine, sometimes referred to as an agent. In addition, a collector can, for example, be software that collects data remotely over a public or private network without the use of an agent, sometimes referred to as an aggregator. In some embodiments, the system and method of the present teaching can use one or both of these collection systems at different locations across the infrastructure.

The information data from the collectors 110, 112, 114 is then sent to a policy engine 102. The policy engine 102 can be running on one or more processing platforms. The policy engine 102 can include some or all of the processing steps described in various embodiments of the present teaching. In general, the policy engine performs policy-based operations that are related to the resources in the shared infrastructure 110, 112, 114. The policy engine 102 can provide various forms of outcomes to users of the shared infrastructure 110, 112, 114, such as notifications and actions including real time and historical actions. One feature of the present teaching is that the policy engine 102 is adaptable at run time by the user or by automation. As a result, the policy engine 102 of the present teaching is far more scalable and extensible than prior art policy engines that are restricted to static, pre-defined types of assets, collection methods, and policies. This is in part due to the inclusion of a metadata system that interacts with the policy engine that allows the user or other entity to modify various aspects of the system in order to provide scalability and flexibility.

Figure 2:
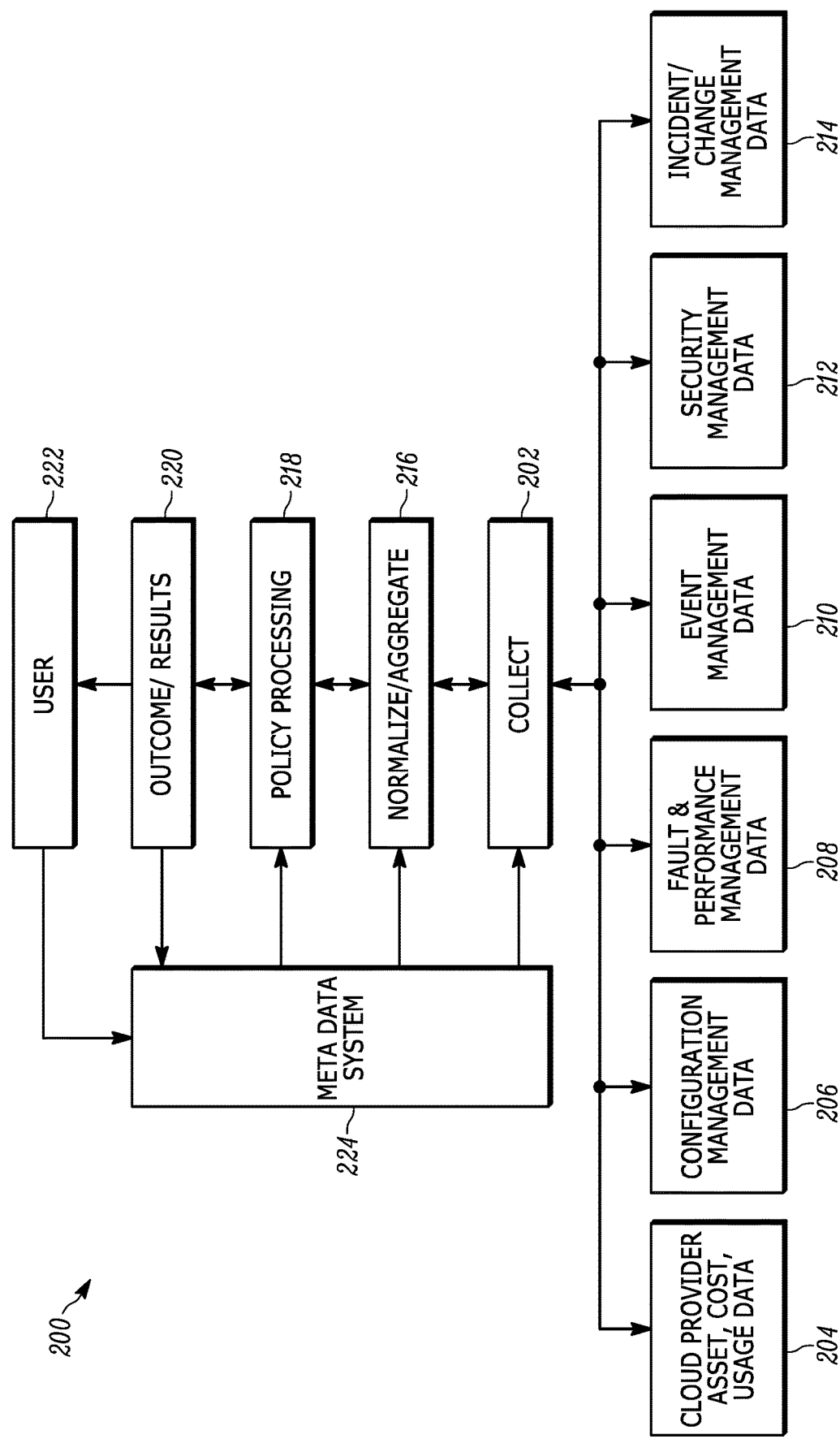
FIG. 2 illustrates a block diagram of a system and method for performing policy-based operations on a shared computer infrastructure that describes data collection and processing functions according to one embodiment of the present teaching.

FIG. 2 illustrates a block diagram of a system 200 for performing policy-based operations that describes data collection and processing functions according to one embodiment of the present teaching. The system 200 includes a collection system processor 202 that collects various data from various elements and processes that run on shared infrastructure. For this example, the data include: (1) asset, cost, and usage data 204, which can be provided by a cloud provider; (2) configuration management data 206; (3) fault and performance management data 208; (4) event management data 210; (5) security management data 212; and (6) incident and change management data 214. There is a normalizer process 216 that normalizes the data. The normalizer process 216 can optionally include an aggregator that aggregates the collected data from the collection system processor 202. The normalized and/or optionally aggregated data is then processed by a policy processing system 218 that determines, for example, if the collected data exceeds a particular policy boundary. The output of the policy processing is sent to an outcome/results processor 220.

The outcome/results processor 220 produces, for example, notifications, actions and history of actions to a user 222. The user 222 and the outcome/results processor 220, provide inputs and data to a metadata system 224. The metadata system 224 stores and maintains an adaptable set of information that is input to one or more of the various processing systems 202, 216, 218. The metadata system 224 can be dynamically extended or modified, allowing the policy engine method to be changed, for example, at run time or after some event or other processing outcome. Unlike known policy engines, the metadata system includes behavioral features that can be extended or modified and can influence the processing of the policy processing steps. Behavior can include, but is not limited to, for example, new functions, operators, collection channels and methods and aggregation logic. For example, the collector processing system 202 is provided various collection methods to use. The normalizer/aggregator 216 is provided with various classes that describe asset types and their relationships. The normalizer can use these classes to determine that the collected data from two resources represent a common class. Classes include, for example, users, tenants, and accounts. Classes also include assets, data elements, asset data, functions, operators, and actions. In general, classes represent a broad construct, described further herein. The policy processor 218 is provided with expressive rules that can describe policy conditions. The policy processor 218 is also provided extensible operations and evaluation triggers. The inputs to the metadata system 224 from the user 222 and the outcome processing system 220 help to determine these various information sets, and these may be provided to the various processing systems at runtime for the system 200. The metadata system 224 may provide the information at runtime.

One aspect of the present teaching that is implemented by the metadata system 224 is the use of a metadata language that allows expression of heterogeneous managed entity types in a uniform form. Entity types are also referred to as classes. The form includes an entity name, entity properties, entity relationships, and entity class composition. The entity name is a user-meaningful name. Each property is defined in the form of data type and constraints on the values the data type can assume. The entity relationships to other entities are expressed, including the expected cardinalities (for example, 1:1, 1:[0-1], M:M etc.). Classes can be composed to form more complex classes.

Another aspect of the present teaching is that the metadata system 224 utilizes a core set of foundational classes. These foundational classes are expressed in the metadata language as described above. The classes provide several constructs. One construct is a platform user that represents a human principle which belongs to a tenant and also has the ability to affect actions in the system. A second construct is an account that is a representation of a source of information that logically segregates it from other sources. Accounts, at a minimum, have a name and a definite type. Accounts can also have credentials. The account type indicates the type and collection method of information.

A third construct is an asset. An asset represents a class, capturing basic properties of an entity, which represents an asset (for example, containment, ownership, lifecycle etc.). A fourth construct is a data element that represents a class, capturing basic properties of an entity which represents a datum ingested into the system. This includes properties, such as type of data (for example, event, metric, asset, and log-entry), fetching mechanism (for example, pull vs. push), and numerous other possible types.

A fifth construct is asset data, representing a class capturing basic properties of an entity, which represents a datum related to an asset. A sixth construct is function, operator and action. Each of these basic elements contributes new capabilities into the system for data enrichment, calculations and affecting change into the system under management respectively. A seventh construct is a collection channel. A collection channel describes a means through which the collection subsystem can bring data into the system. The definition of a collection channel references the data types it will produce, and the code that will be required to be execute the collection activities. These core classes are extended by metadata contributions that can occur during the operation of the system 200.

Some embodiments of the metadata system 224 use a metadata repository. The metadata repository contains the currently active entities in the system and allows for the dynamic introduction of new entities via Application Programming Interface (API). Some embodiments of the metadata system 224 use an integrations repository that manages the lifecycle of new integrations deployed into an instantiation of the metadata system 224. The repository holds artifacts which are consumed by other parts of the system to implement the capabilities of the integration.

Figure 3:
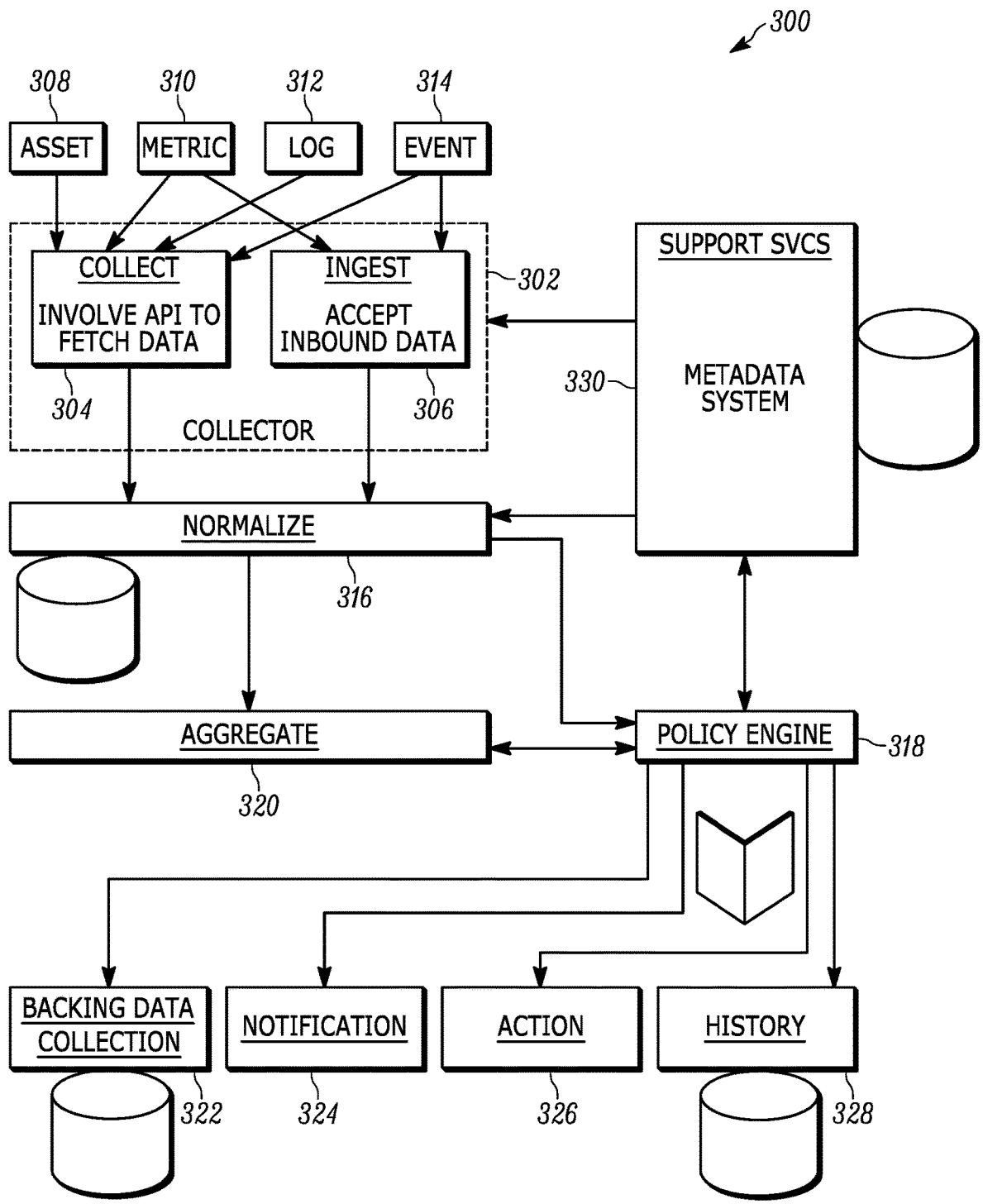
FIG. 3 illustrates a block diagram of a system and method for performing policy-based operations on a shared computer infrastructure including ingestion and back-end operations according to one embodiment of the present teaching.

FIG. 3 illustrates a system 300 that implements a method of performing policy-based operation on a shared computer infrastructure according to the present teaching including ingestion and back-end operations. The collector 302, which can also use, for example, the collector 116, 116', 116" described in connection with FIG. 1, or the collection system processor 202 described in connection with FIG. 2, provides both a collect 304 operation and an ingest 306 operation. The collect operation module 304 involves an API to fetch data from a resource in a shared infrastructure. The ingest operation module 306 accepts inbound data. Collection and ingestion can include information gathered from assets 308, metrics 310, logs 312 or events 314 that are generated by or related to the resources in the shared computer infrastructure. The information can be provided directly from the resource or processor, from the service provider's management system, or from various other elements that provide information about computing assets in shared infrastructures.

The collector 302 provides the collected data to a normalizer 316 that normalizes collected data and passes the normalized data to the policy engine processor 318 and/or aggregator 320. Aggregated data from the aggregator 320, can also be provided to the policy engine processor 318. The policy engine 318 determines if the various policy conditions are exceeded. The policy engine 318 can execute expressive rules that include logical expressions of conditions to determine the conditions. The policy engine 318 can perform extensible operations on data to help determine if the policy conditions are met. The policy engine 318 also provides data that includes information about policy conditions that are exceeded to backing data collection 322, notification processor 324, action processors 326 and historical archives 328. These various outcome/results processors provide information to users about how the shared system they operate is running based on the input policies. These various outcome/results processors also provide information to the metadata system 330 that maintain information of various data structures, collection methods, policy processing methods, and policy conditions that are used by the policy engine 318, collector 302, normalizer 316 and aggregator 320 to perform their particular processing tasks. The information may be changed and updated at runtime for the policy engine or other processor in the system.

One feature of the system 300 is the use of data stores that provide persistent storage and query capabilities for configuration, asset information, performance data, user and system action audit data, ingested logs, and events. Another feature of the system and method of the present teaching is use of the data collector 302. The data collector 302 performs data collection and ingestion services. The normalization services 316 leverage the metadata and integration repositories to update the system with the current state of monitored information technology systems. The data from different systems and channels is normalized to a consistent representation of common attributes using integration specific code. That is, the data from one or more heterogeneous managed entities is normalized to generate the set of classes described herein that are part of the metadata language that expresses the heterogeneous managed entity for use by the policy engine. One skilled in the art will appreciate that the present teaching is not limited to a policy engine application that uses the normalized data. Numerous other applications can benefit from the normalized data generated by the system and method of the present teaching.

In some embodiments, the policy engine 318 performs policy evaluation that leverages the foundational capabilities described herein in the following way. Policy evaluation can be triggered based on a schedule, expressed either as a time (e.g. 4 AM every Monday) or as a frequency (every 10 minutes). Policy evaluation can be triggered based on availability of new data, either external to the system, for example, new event posted into the ingestion API. Policy evaluation can also be triggered based on a trigger internal to the system and/or derived from other components, for example, new forecasted resource estimate has been computed.

Once triggered, policy evaluation proceeds in the policy engine 318 as follows. The minimal set of data required for policy evaluation is identified based on the condition expressed in the policy. The data source (e.g., event, log, metric, pre-aggregated Online Analytical Processing (OLAP), asset etc.), and possible candidates (e.g., assets matching a specific geography) are collated. The set of candidates is successively narrowed down, retaining just those candidates that are considered to violate the evaluated condition from the set of conditions expressed by the policy. Once all conditions have been evaluated, any remaining candidates are considered as "violators" by the following steps.

Finally, any violations of a policy identified above can trigger one or more of the following reactions by the system. One reaction is to assemble the backing data and then send the backing data to backing data collection 322, identifying all the violators and the conditions that led to the violation being declared as well as details about the context (e.g., which tenant and sub-division within the tenant, detection time, data freshness timestamp etc.) is captured. Another reaction is that notification is triggered to the users configured for the policy condition using notification processor 324. Yet, another reaction is that the configured set of actions (e.g., terminate a Virtual Machine, start a Virtual Machine, delete a storage volume) is triggered in action processor 326. In addition, the history of the activities performed is maintained in the history store 328.

One feature of the policy engines of the present teaching is that they can utilize a run-time adaptable policy engine capable of evaluating rules on a defined set of data types. The run time adaptable policy engine is able to dynamically configure itself to express and evaluate rules on new types of data and with new operations. The run time adaptable policy engine utilizes extensible data types. The extensible data types provide a pre-defined set of known data (e.g. assets, performance metrics, log entries). While the data types are fixed in structure, they can be extended externally. For example, it is possible to add Alibaba Cloud Virtual Machines as a new type of asset. All data types must have relations to each other (e.g. Alibaba Cloud Virtual Machines have a relationship to CPU performance metrics and to its month usage/cost). The policy engine can also utilize expressive rules. These expressive rules are logical expressions that can use operations on the extensible data types. For example, an expressive rule can be expressed as if the failed login using root account occurs some number of times in some time duration.

The run-time adaptable policy engine also can utilize extensible operations. The operations allow the policy engine to manipulate collected data before determining a condition. For example, counting log entries over a fixed time period, or averaging a number of CPU cycles over a period of time. Extensible operations are functions that can be performed on known data types. For example, an extensible operation can, for example, check frequency of log entries over time, where the log entry is a data type. These operations are often extensible outside the policy engine. This capability allows, for example, the policy engine to determine a policy condition that comprises characteristics of ingested events, such as a frequency of ingested events and/or a number of ingested events. Ingested events include, for example, user logins, or other logged activities.

In various embodiments, the run-time adaptable policy engine utilizes an evaluation trigger. In an evaluation trigger, data types are often exposed either as a data set that is evaluated as needed, a stream that is evaluated continuously, or as an event that is evaluated in response to external stimuli.

The system and methods of the present teaching allow operators/users to define a set of governance policies globally by combining different aspects (cost, security, usage, utilization, and/or other forms of performance characteristics of a computer system) which established the desired and expected bounds which information technology systems are expected to exhibit. These systems and methods also define corrective automated actions to be performed when bounds are breached, or particular conditions are exceeded.

For example, systems and methods of the present teaching can enforce a policy specifying that each cluster of servers implementing a "Cassandra" database deployment should have no less than 100 Gb and no more than 10 Tb of operational storage at any given time. In this example, the collection system will periodically collect and inventory of the available resources. The event receiver will be notified about changes in operational status of individual components of the cluster. An example is if a storage unit (disk) fails or a server becomes unresponsive, a notification will be generated by the system under management and processed by the event receiver.

As is known by those skilled in the art, a virtual node is a data storage layer and/or virtual machine operating within a server. A server contains one or more virtual nodes, typically more than one hundred. A data center contains one or more servers, and typically a large number of servers, more than one thousand. A cluster is a collection of nodes that are part of a distributed system providing a specific function. These features apply, for example, to Cassandra cluster operating in the scope of the system under management, regardless of the specific manifestation of a "server" or a "storage unit" and the specifics of the mechanism through which data is retrieved. Cassandra is an open source software system that manages data across distributed servers, providing, for example, a robust distributed database. In various embodiments of the present teaching, servers can be in a data center as physical servers, in Amazon's, IBM's, Alibaba's, or any other public cloud, or in a private VMWare cloud. This is achieved by applying the normalization layer to identify those data center resources to which the policy should apply in an abstract way. As such, the normalizer makes the system much more extensible, and much more flexible than prior art system that implement policy engines because, for example, the normalizer allows the implementation of a policy across similar resources residing in different data centers and/or allows the implementation of a policy across multiple different resources within a same data center, as well as combinations of these examples.

When the metadata system is manipulated in a way to provide a new source of data that provides data about other manifestations of servers capable of running Cassandra clusters, the system will apply the above policy automatically, as new data flows into the system. This capability drastically reduces complexity in operating large dynamic (i.e. frequently changing) heterogeneous environments (i.e., running similar application in many different types of compute environments).

Figure 4:
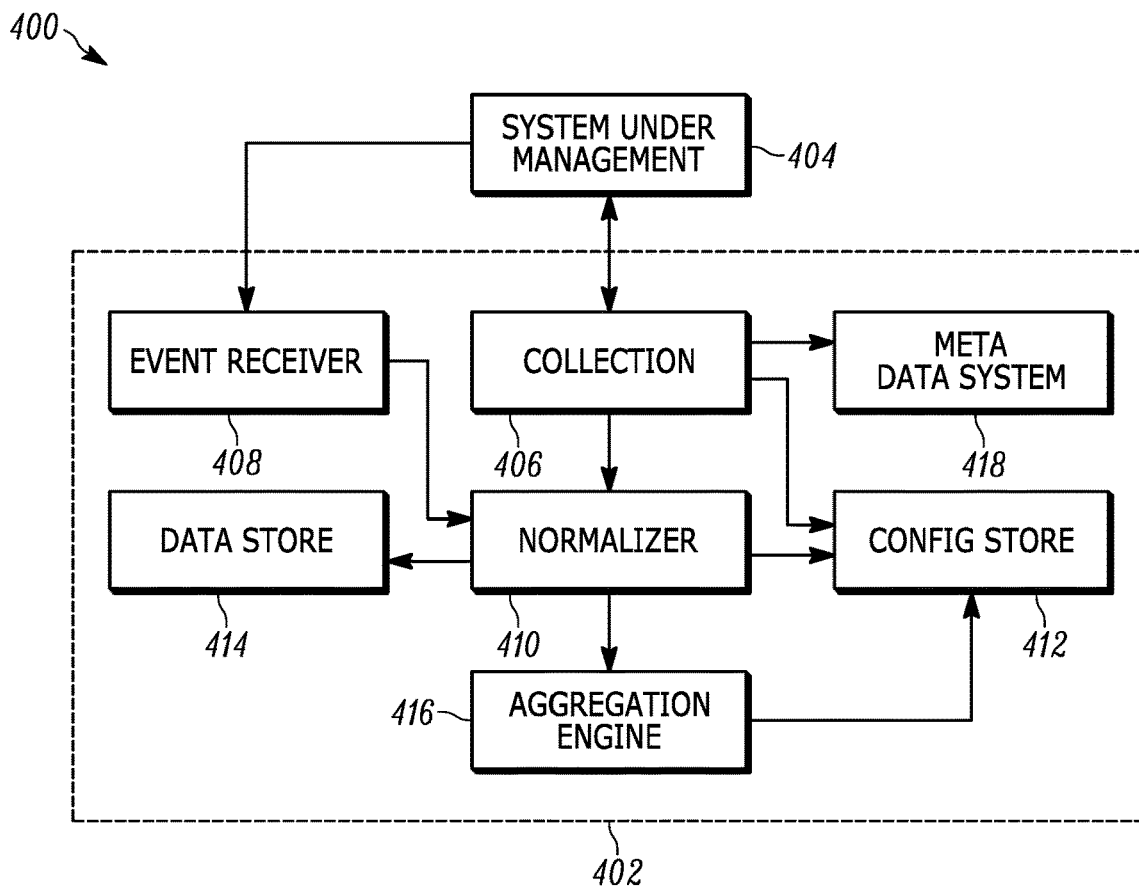
FIG. 4 illustrates a block diagram of components in a system and method that implements a policy-based operation on a shared computer infrastructure that operates on a system under management according to one embodiment of the present teaching.

FIG. 4 illustrates a block diagram of an embodiment of components 400 in a system 402 that implements a policy-based operation of the present teaching that operates on a system under management 404. In some embodiments, this system under management 404 is a set of resources in a public or private cloud belonging to a particular tenant. The system under management 404 includes systems to which governance policies are to be applied. Multiple system under managements may be run at the same time using the same or different policies, although only one system under management 404 is shown in the figure. The system and method of the present teaching helps to ensure that the characteristics and operational behavior of the system under management 404 complies with the governance policies. The term system under management represents any Information Technology (IT) system that can be found in an enterprise environment. The system and method of implementing a policy based operation concurrently operates with many separate systems under management.

The collection process 406 includes a set of processes and activities that perform outbound, that is, from the system 402 to the system under management 404, to retrieve information representing the past and current operational characteristics of the system under management 404. The event receiver 408 is used in embodiments in which the information technology systems can be configured to emit outbound notifications and data streams representing changes in their operational state. The event receiver 408 sends the notifications and performs the required exchanges with system under management 404 to accept notification and propagate them into the system.

The normalization component 410 retrieves data via collection 406 and/or event-receiver 408. The normalization component 410 represents the discrete pieces of independent data regarding different elements of the system under management 404, and represents different concerns that become the object of the policy, for example, configuration, performance, activity, cost. The normalization component 410 then connects the separate sources/types of data that comprise the discrete pieces of independent data to logical entities. The normalization component 410 also maps system-under-management-type-specific information (e.g.

information about a "server" from AWS vs Microsoft or from Public Cloud vs Data Center) into a generic representation of the type of asset described.

The configuration store 412 contains configuration required by other parts of the system, for example, credentials required to collect information. The configuration store maintains information used by other parts of the system. The data store 414 component is responsible for efficiently storing data ingested into the system. While the data store 414 component stores data about individual elements, the aggregation engine 416 produces summarized analysis that can be queried across multiple dimensions. For example, CPU utilization information for all servers in an environment is generally in the form of summaries that can be queried by different dimensions, such as location, server-class, operating system etc. Queries can be answered with statistical information for the group of servers matching the specified dimensions, which can be, for example, a certain percentile of all hosts in a certain geographic region, running a certain operating system, of size "large" over the last 7 days.

The metadata system 418 describes relationships between different types of data in the platform which direct the manipulation of data by the normalization component and the policy engine. Various embodiments of the metadata system 418 are described, for example, in connection with the description for FIGS. 2 and 3.

Figure 5:
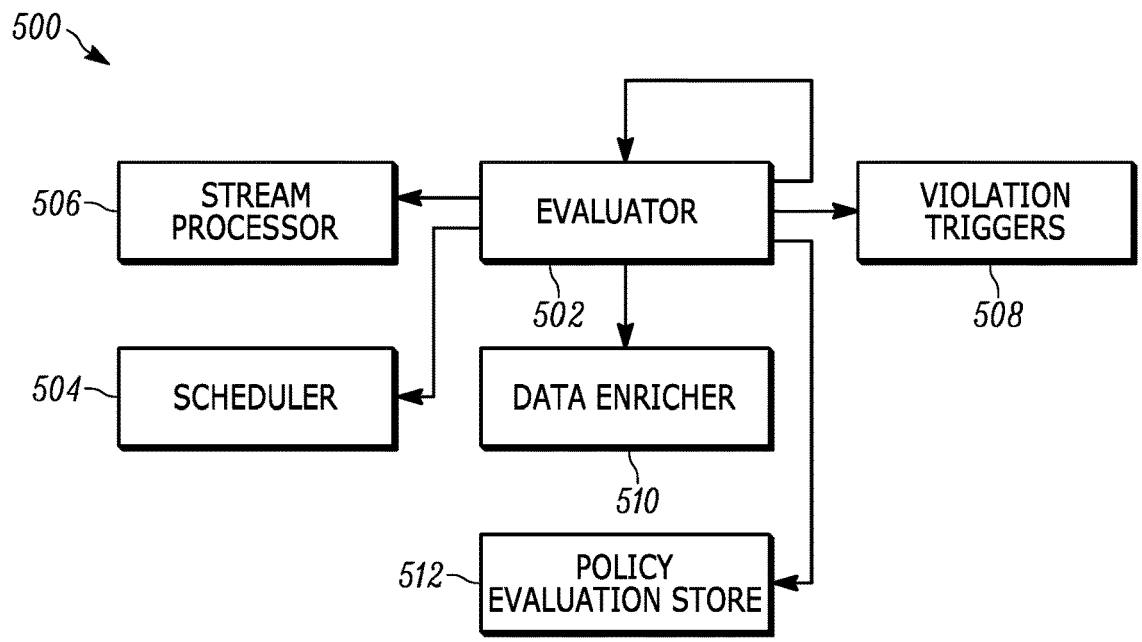
FIG. 5 illustrates policy engine components in a system and method that implements a policy-based operation on a shared computer infrastructure according to one embodiment of the present teaching.

FIG. 5 illustrates an embodiment of policy engine components 500 of the present teaching. Policy evaluation in an evaluator 502 can be triggered based on a schedule, expressed either as a time (e.g., 4 am on each Monday) or as a frequency (e.g., every 10 minutes), generated by a scheduler 504. Policy evaluation can also be based on streamed data from data collection and processing system, referred to as a stream processor 506. Once triggered, policy evaluation in the evaluator 502 proceeds as follows. First, the minimal set of data required for policy evaluation is identified based on the condition expressed in the policy. The data source (e.g., event, log, metric, pre-aggregated OLAP, asset etc.), and possible candidates (e.g., assets matching a specific geography) are collated. Then the set of candidates is successively narrowed down, retaining just those candidates that are considered to violate the evaluated condition from the set of conditions expressed by the policy.

Once all conditions have been evaluated, any remaining candidates are considered as "violators". These candidates are sent to the violations trigger component 508. Any violations of a policy identified above can trigger one or more of the following reactions: (1) the backing data; (2) identifying all the violators; and (3) the conditions that led to the violation being declared and details about the context (e.g., which tenant and sub-division within the tenant, detection time, data freshness, timestamp, etc.) are captured. A notification is triggered to the users configured for the policy condition. The configured set of actions (e.g., terminate a VM, start a VM, delete a volume, etc.) is triggered. The history of the activities performed can be sent to the user.

An output of the evaluation component 502 is fed back to the evaluation component 502 to improve future evaluations. Another output of the evaluation component 502 is provided to a data enricher 510 that enriches the data. Yet another output of the evaluation component 502 is provided to a policy evaluation store 512 to maintain an archive of evaluations.

Figure 6:
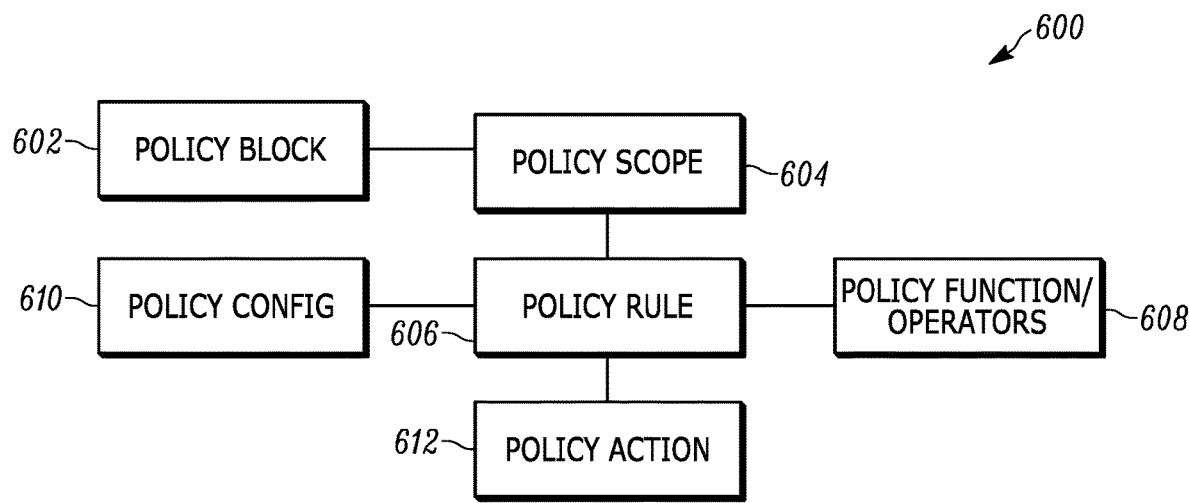
FIG. 6 illustrates a logical view of a policy in a system and method that implements a policy-based operation on a shared computer infrastructure according to one embodiment of the present teaching.

FIG. 6 illustrates a logical view of an embodiment of a policy 600 according to the present teaching. During policy evaluation, each block 602, and its constituents, is evaluated independently. However, in some systems and methods according to the present teaching, blocks are evaluated in parallel. Policy scope 604 identifies the types of sources of information and conditions they must meet in order to generate candidate data to be evaluated by this policy. For example, the policy scope 604 can be a set of systems under management instances, a geography in which those systems under management exist, or the owners of those systems under management.

Policy rules 606 include one or more rules which are used in deciding if an aberrant condition exists. For example, an aberrant condition exists if certain performance characteristics of a computer system are exceeded. Performance characteristics include, for example, percent utilization of one or more CPUs, percent utilization of disk or storage systems, and/or other functional benchmarks of compute resources. Performance characteristics can also include performance of software that runs on the computer system. for example, a runtime of a software application. Rules leverage "functions" and "operators" to enrich the source data, to evaluate properties of the resulting data set, and to apply logical expressions (e.g., >, >=, A AND B, etc.) to make a determination if the data presented violates the desired operating conditions as expressed by the rule.

Policy functions 608 are used in defining the policy rules to provide additional contextual information about the data being evaluated. For example, if a given server is evaluated, functions can be used to retrieve information about the total number of servers matching a condition (e.g., aggregate information), performance information about the server utilization, etc. New functions can be added to the system and existing ones can be modified by updates to the metadata repository. Policy operators 608 evaluate various types of data, and apply a logical expression to it. For example, an operator can be used to compute the average CPU utilization for a set of servers as given by the data it is presented. New operators can be added to the system and existing ones can be modified by updates to the metadata repository.

Policy configuration 610 includes, for example, scheduling information describing when to evaluate the policy rule, what severity to attach to a situation when an out of bounds condition has been identified, and other housekeeping configuration. A set of policy actions 612 to be triggered as a result of an aberrant condition being identified is included. Actions can leverage functions to further refine the set of managed elements to act on. An example of such an action is, if a disk has more than seven snapshots, find the oldest snapshots using a function and apply an action to delete those. New actions can be added to the system and existing ones can be modified by updates to the metadata repository.

Figure 7:
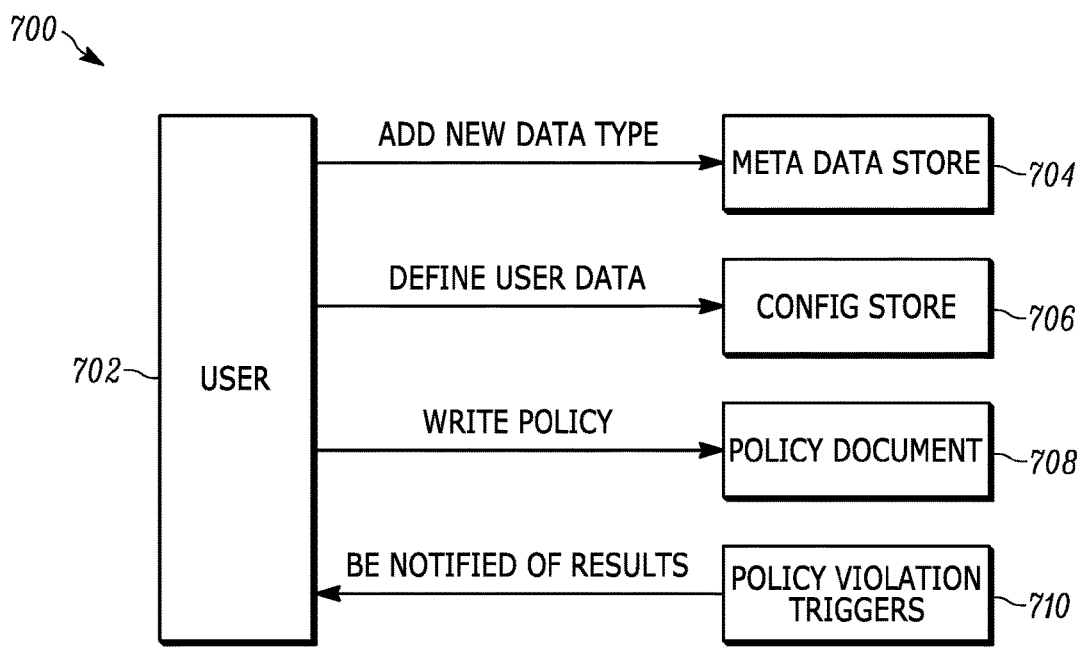
FIG. 7 illustrates embodiments of various methods by which human operators interact with the system and method that implements a policy-based operation on a shared computer infrastructure of the present teaching.

FIG. 7 illustrates embodiments of methods 700 where human operators interact with the system of the present teaching. Users 702 interact with the metadata store 704 to manipulate metadata to add new capabilities into the system, remove existing capabilities, and to allow access to capabilities to different operators. Users 702 interact with configuration store 706 to inspect and modify configuration to direct the system's operations. One important user interaction is when the user 702 interacts with policy documents 708 to manipulate those policy documents to direct the operation of the policy engine's evaluation activities. An example of which is changing conditions or processing methods. Users 702 interact with policy violation triggers 710. The system can generate, based on the particular configuration, notifications to users upon the detection of aberrant conditions by the policy engine. This notification to the user 702 can be, for example, over email, pager or other communication mechanisms.

One feature of the system and method for a run-time adaptable policy engine for heterogeneous managed entities of the present teaching is that it is easily integrated into current information technology environments. For example, human operators configure the system with several categories of information. One category is integrations to manifest in the environment. At a high level, integration adds logic into the system dynamically allowing users to introduce new capabilities into the system. In addition, human operators can create channels and credentials to fetch information into the system from information technology environments they operate (e.g. AWS credentials, VMWare server location and credentials). Human operators can also provide governance policies describing desired conditions in the IT environment, and the actions to be taken when those conditions are violated. An example of when a set of conditions are violated is if a cluster of servers is less than a percent of utilizing, less than the provisioned CPU capacity, and it's costing more than a predetermined about a week to operate, then notify the owner.

In addition to human operators, information technology systems (e.g., private, public, or hybrid cloud systems) and services (e.g., DataDog, Chef) provide mechanisms to fetch (i.e., provide Application Programing Interfaces (APIs) which allows querying for data), or push (e.g., webhooks, SNMP Traps etc.) information of interest into the system. The IT systems additionally provide APIs to affect change or generate notifications to human operators. These are invoked as a result of the policy engine detecting out-of-bounds conditions as defined by the governance policies mentioned above.

Figure 8:
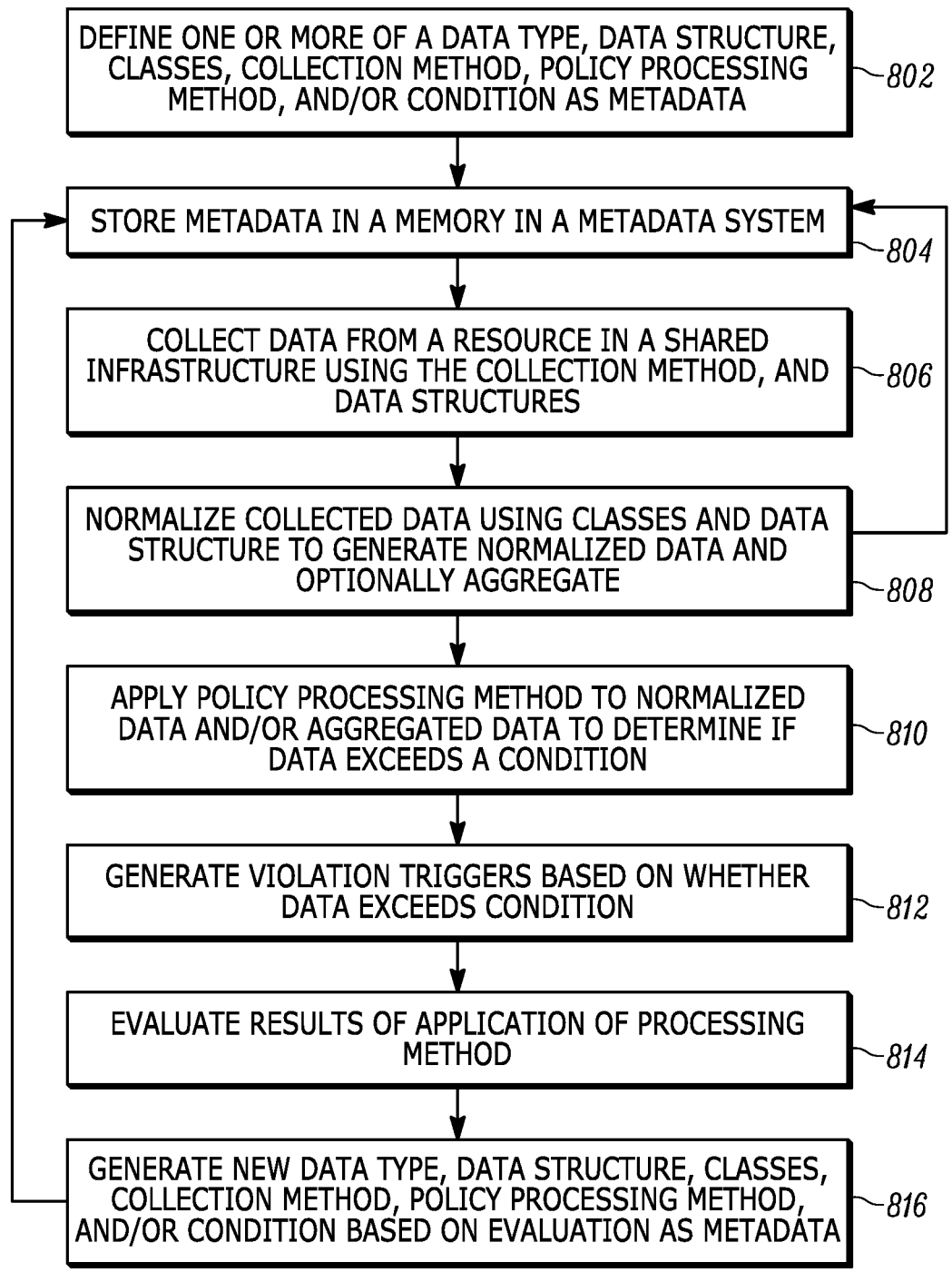
FIG. 8 illustrates a process flow diagram of a method of executing a policy-based operation on a shared computer infrastructure according to one embodiment of the present teaching.

FIG. 8 illustrates a process flow diagram of an embodiment of a method 800 of executing a policy-based operation on a shared computer infrastructure. The first step 802 is to define one or more of a data type, data structure, classes, collection methods, policy processing methods, and/or policy conditions into a metadata system. The metadata is stored in a metadata repository in step two 804. Data is collected from a resource in a shared infrastructure in a third step 806. In some embodiments, the collection method used is based on the collection method in the metadata repository, and that method can be changed at runtime. In step four 808, which is optional in some embodiments according to the present teaching, the collected data is normalized. The collected data that represents a discrete piece of independent data regarding different elements of a system under management and that represents different aspects of that system, such as configurations, performance, activity and cost are connected to classes, or logical entities, so they may be uniformly processed by the policy engine. In some embodiments, the classes are changed at runtime. Step four 808 can optionally aggregate data to produce summarized analysis that can be queried across multiple dimensions. In some embodiments, step four 808 generates new data and metadata. The generated metadata is input to the metadata system by storing the generated metadata in the metadata system in step two 804.

Step five 810 of the method applies the policy processing method to the collected and/or optionally normalized and/or optionally aggregated data to determine if the data exceeds a condition. In various embodiments, the policy follows the policy blocks illustrated in FIG. 6. In some embodiments of the method, the policy processing method includes logical expressions and operations. Also, in some embodiments, the policy processing methods and/or conditions are changed at runtime.

Step six 812 of the method generates violation triggers in the case of policy conditions being exceeded. Optional step seven 814 evaluates the policy outcomes in order to determine modifications to the metadata system regarding, for example policy processing methods, conditions and/or collection rules. In step eight 816, new data types, data structures, classes, collection methods, policy processing methods and/or conditions are changed based on, for example, the evaluation step seven 814, a user input, or other information. In some embodiments, the method then proceeds back to step two 804.

Thus, in one aspect the present teaching, a computer-implemented method of executing a policy-based operation on a shared computer infrastructure includes storing in a computer memory a dynamically extensible metadata system that is in communication with a processor that executes policy-based operations, where the dynamically extensible metadata system can be modified and can include a data structure, a collection method, a policy processing method, and/or a policy condition. In various embodiments, the data structure can include an asset, a performance metric, and/or log entries. The policy processing method can include calculating a number of failed logins. The policy processing method can also include calculating a cost of executing a software application. Also, in various embodiments, the policy condition can monitor percent utilization of provisioned CPUs, a cost, a runtime of a software application, a number of failed logins, or other conditions to be governed.

The dynamically extensible metadata system is optionally modified by modifying at least one of the data structure, the collection method, the policy processing method, and the policy condition stored in the computer memory. The modifying the dynamically extensible metadata system can include redefining the data structure to add a new virtual machine asset source. The modifying the dynamically extensible metadata system can also include redefining the policy processing method such that a policy rule for an existing service provider and a policy rule for a new service provider are the same policy rule. The modifying the dynamically extensible metadata system can also include redefining the policy processing method such that a policy rule is extended using a logical expression. The modifying the dynamically extensible metadata system can also include redefining the collection method to add a new collection channel. The modifying the dynamically extensible metadata system can be performed at run time.

The collection method is then executed to collect data from a first computer resource in the shared computer infrastructure using a first data structure and from a second computer resource in the shared computer infrastructure using a second data structure, where the first data structure and the second data structure are different data structures. For example, the first computer resource can be a computer resource located in a first service provider domain and the second computer resource can be a computer resource located in a second service provider domain that is different from the first service provider domain. Also, the first computer resource can be a CPU, a data storage unit, virtual machine, or a snapshot of virtual machine's disk file.

The collected data from the first computer resource and the collected data from the second computer resource are optionally normalized such that the collected data from the first computer resource and the collected data from the second computer resource have a common class, thereby generating normalized data. In various embodiments, the common class can be, for example, a tenant, account, an asset type, or a property of the collected data. The normalizing the collected data can include normalizing data from a collected data stream. The normalizing the collected data can also include normalizing stored collected data.

The collected or optionally normalized data is processed with the policy processing method to determine if the data meets the policy condition. The processing the collected or optionally normalized data with the policy processing method can include determining if the collected or optionally normalized data meets the policy condition in near-real time. The processing the collected or optionally normalized data with the policy processing method to determine if the collected or optionally normalized data meets the policy condition can also include determining whether the collected or optionally normalized data meets the policy condition on demand. The processing can include applying a logical expression to the collected or optionally normalized data.

In various embodiments, the method can further comprise aggregating the collected or optionally normalized data. Also, in various embodiments, the method can further comprise evaluating the processed collected or optionally normalized data to determine a new policy condition or a new policy processing method. The new policy condition or new policy processing method can be added to the metadata system. The method can also include evaluating the processed collected or optionally normalized data to determine a new collection method. The new collection method can be added to the metadata system. Furthermore, the method can also include generating a violation trigger based on whether the collected or optionally normalized data meets the policy condition.

In another aspect the present teaching, a computer-implemented method of executing policy-based operations on a shared computer infrastructure includes storing in a computer memory a dynamically extensible metadata system that is in communication with a processor that executes policy-based operations, where the dynamically extensible metadata system can be modified and can include a data structure, a collection method, a first and second policy processing method, a functional operation, and a first and second policy condition. For example, the first policy processing method can include calculating a number of failed logins or calculating a cost of executing a software application. In various embodiments, the data structure can be an asset, a performance metric, or log entries. The dynamically extensible metadata system is modified at run time by modifying at least one of the data structure, the collection method, the first and second policy processing method, the functional operation, and the first and second policy condition.

The collection method is executed to collect data from a computer resource in the shared computer infrastructure using the data structure. In various embodiments, the computer resource can be a CPU, a data storage unit, a snapshot of virtual machine's disk file, or a virtual machine. The executing the collection method can include collecting data from a first and a second computer resource. The collecting data can include streaming the collected data to generate a collected data stream. The collection method can also fetch data using an application interface. The collection method can also include accepting inbound data from the shared computer infrastructure.

The collected data from the computer resource is optionally normalized such that the collected data has a class, thereby generating normalized data. For example, the class can be a tenant, an account, an asset type, or a property of the collected data. The normalizing the collected data can include normalizing data from the collected data stream. The collecting data can include storing the collected data and the normalizing the collected data can include normalizing the stored collected data. The collected or optionally normalized data is processed with the first policy processing method to determine if the collected or optionally normalized data meets the first policy condition. The processing can be in near-real time. The collected or optionally normalized data can be processed to determine whether the collected or optionally normalized data meets the policy condition on demand.

In some embodiments, a functional operation is performed on the collected or optionally normalized data to generate new collected or optionally normalized data. For example, the functional operation can be checking a frequency of log entries over time. The new collected or optionally normalized data is processed with a second policy processing method to determine if the new collected or optionally normalized data meets the second policy condition.

The computer-implemented method of executing policy-based operations on the shared computer infrastructure according to the present teaching can also include aggregating the collected or optionally normalized data. Also, in various embodiments, the method can include evaluating the processed collected or optionally normalized data to determine a new policy condition, to determine a third policy processing method, to determine a new functional operation, or to determine a new collection method. These new methods, functional operations and/or collection methods can be added to the metadata system.

Furthermore, the computer-implemented method of executing policy-based operations on the shared computer infrastructure according to the present teaching can include generating a violation trigger based on whether the collected or optionally normalized data meets the first or second policy condition. For example, the first and/or the second policy conditions can include a variety of performance characteristics of a computer system, a software application running on the shared computer infrastructure, and/or a characteristic of ingested events, such as a frequency or number of ingested events. These can include, for example, percent utilization of a provisioned CPU, a cost or a runtime of a software application, and/or a number of failed logins.

EQUIVALENTS

While the Applicant's teaching is described in conjunction with various embodiments, it is not intended that the Applicant's teaching be limited to such embodiments. On the contrary, the Applicant's teaching encompass various alternatives, modifications, and equivalents, as will be appreciated by those of skill in the art, which may be made therein without departing from the spirit and scope of the teaching.

What is claimed is:

1. A computer-implemented method of executing a policy-based operation on a shared computer infrastructure, the method comprising:

storing in a computer memory a dynamically extensible metadata system that is in communication with a processor that executes policy-based operations, the dynamically extensible metadata system including metadata defining a data structure, a collection method, a policy processing method, and a policy condition;

modifying the dynamically extensible metadata system by redefining the policy processing method such that a policy rule for an existing service provider and a policy rule for a new service provider are the same policy rule;

executing the collection method to collect data from a first computer resource in the shared computer infrastructure using a first data structure and from a second computer resource in the shared computer infrastructure using a second data structure, wherein the first data structure and the second data structure are different data structures;

processing the collected data with the policy processing method to determine if the collected data meets the policy condition;

generating a new data type based on whether the collected data meets the policy condition; and modifying the metadata of the dynamically extensible metadata system to include the new data type.

2. The computer-implemented method of claim 1, further including modifying the dynamically extensible metadata system by modifying at least one of the data structure, the collection method, the policy processing method, and the policy condition stored in the computer memory.

3. The computer-implemented method of claim 2, wherein the modifying the dynamically extensible metadata system is performed at run time.

4. The computer-implemented method of claim 2, wherein modifying the dynamically extensible metadata system includes redefining the data structure to add a new virtual machine asset type.

5. The computer-implemented method of claim 2, wherein modifying the dynamically extensible metadata system includes redefining the policy processing method such that a policy rule is extended using a logical expression.

6. The computer-implemented method of claim 2, wherein modifying the dynamically extensible metadata system includes redefining the collection method to add a new collection channel.

7. The computer-implemented method of claim 1, further including generating normalized data by normalizing the collected data from the first computer resource and the collected data from the second computer resource such that the collected data from the first computer resource and the collected data from the second computer resource have a common class.

8. The computer-implemented method of claim 7, wherein the processing of the collected data with the policy processing method to determine if the collected data meets the policy condition includes processing the normalized data with the policy processing method to determine if the normalized data meets the policy condition.

9. The computer-implemented method of claim 7, wherein the common class includes a user.

10. The computer-implemented method of claim 7, wherein the common class includes an account.

11. The computer-implemented method of claim 7, wherein the common class includes an asset type.

12. The computer-implemented method of claim 7, wherein the common class includes a property of the collected data.

13. The computer-implemented method of claim 1, wherein the collected data using the collection method includes streaming the collected data to generate a collected data stream.

14. The computer-implemented method of claim 1, wherein the processing of the collected data to determine if the collected data meets the policy condition includes determining if the collected data meets the policy condition in near-real time.

15. The computer-implemented method of claim 1, wherein the processing of the collected data with the policy processing method to determine if the collected data meets the policy condition includes determining whether the collected data meets the policy condition on demand.

16. The computer-implemented method of claim 1, further including aggregating the collected data.

17. The computer-implemented method of claim 1, further including evaluating the processed collected data to determine a new policy condition.

18. The computer-implemented method of claim 17, further including storing in the computer memory the new policy condition.

19. The computer-implemented method of claim 1, further including evaluating the processed collected data to determine the new data type.

20. The computer-implemented method of claim 1, further including generating a violation trigger based on whether the collected data meets the policy condition.

21. The computer-implemented method of claim 1, wherein the data structure includes an asset.

22. The computer-implemented method of claim 1, wherein the data structure includes performance metrics.

23. The computer-implemented method of claim 1, wherein the data structure includes log entries.

24. The computer-implemented method of claim 1, wherein the collection method includes accepting inbound data from the shared computer infrastructure.

25. The computer-implemented method of claim 1, wherein the policy condition includes performance characteristics of a computer system.

26. The computer-implemented method of claim 1, wherein the policy condition includes cost characteristics of a computer system.

27. The computer-implemented method of claim 1, wherein the policy condition includes characteristics of software application processes.

28. The computer-implemented method of claim 1, wherein the policy condition includes characteristics of frequency and number of ingested events.

29. The computer-implemented method of claim 1, wherein the policy processing method includes calculating a number of failed logins.

30. The computer-implemented method of claim 1, wherein the policy processing method includes calculating a cost of executing a software application.

31. The computer-implemented method of claim 1, wherein the first computer resource includes a computer resource located in a first service provider domain and the second computer resource includes a computer resource located in a second service provider domain that is different from the first service provider domain.

32. The computer-implemented method of claim 1, wherein the first computer resource includes a CPU.

33. The computer-implemented method of claim 1, wherein the first computer resource includes a data storage unit.

34. The computer-implemented method of claim 1, wherein the first computer resource includes a snapshot of virtual machine's disk file.

35. The computer-implemented method of claim 1, wherein the first computer resource includes a virtual machine.

36. The computer-implemented method of claim 1, wherein the processing method includes applying a logical expression to the collected data.

37. A computer system for executing a policy-based operation on a shared computer infrastructure, the computer system comprising:
   a shared computer infrastructure including a first and a second computer resource;
   a memory including a dynamically extensible metadata system including metadata defining a data structure, a collection method, a policy processing method, and a policy condition;
   a collector electrically connected to the shared computer infrastructure and electrically connected to the memory, the collector to collect data from the first and second computer resource using the collection method; and
   a processor having an input electrically connected to an output of the collector and electrically connected to the memory, the processor to:
      obtain the collected data from the collector;
      modify the metadata of the dynamically extensible metadata system by redefining the policy processing method such that a policy rule for an existing service provider and a policy rule for a new service provider are the same policy rule;
      process the collected data with the policy processing method to determine if the collected data meets the policy condition;
      generate a new data type based on whether the collected data meets the policy condition; and
      modify the metadata of the dynamically extensible metadata system to include the new data type.

38. The computer system of claim 37, wherein the processor is further configured to normalize the collected data from the first computer resource and the collected data from the second computer resource such that the collected data from the first computer resource and the collected data from the second computer resource have a common class, thereby generating normalized data.

39. The computer system of claim 37, wherein the processor is further configured to modify at least one of the data structure, the collection method, the policy processing method, and the policy condition and store the modified at least one of the data structure, the collection method, the policy processing method, and the policy condition in the memory.

40. The computer system of claim 39, wherein the storing of the modified at least one of the data structure, the collection method, the policy processing method, and the policy condition in the memory is performed at run time.

41. The computer system of claim 37, wherein the first computer resource includes a CPU.

42. The computer system of claim 37, wherein the first computer resource includes a snapshot of virtual machine's disk file.

43. The computer system of claim 37, wherein the first computer resource includes a virtual machine.

44. A computer readable storage disk or device comprising instructions which, when executed, cause one or more processors to at least:
   store in a computer memory a dynamically extensible metadata system that is in communication with a processor that executes policy-based operations, the dynamically extensible metadata system including metadata defining a data structure, a collection method, a policy processing method, and a policy condition;
   modify the metadata of the dynamically extensible metadata system by redefining the policy processing method such that a policy rule for an existing service provider and a policy rule for a new service provider are the same policy rule;
   execute the collection method to collect data from a first computer resource in a shared computer infrastructure using a first data structure and from a second computer resource in the shared computer infrastructure using a second data structure, wherein the first data structure and the second data structure are different data structures;
   process the collected data with the policy processing method to determine if the collected data meets the policy condition;
   generate a new data type based on whether the collected data meets the policy condition; and
   modify the metadata of the dynamically extensible metadata system to include the new data type.

* * * * *